Jan. 26, 1937. J. B. HOHMANN 2,068,647
COMBINED ANTI-SLIPPING MILK PAIL AND COWTAIL HOLDER
Filed Sept. 16, 1935
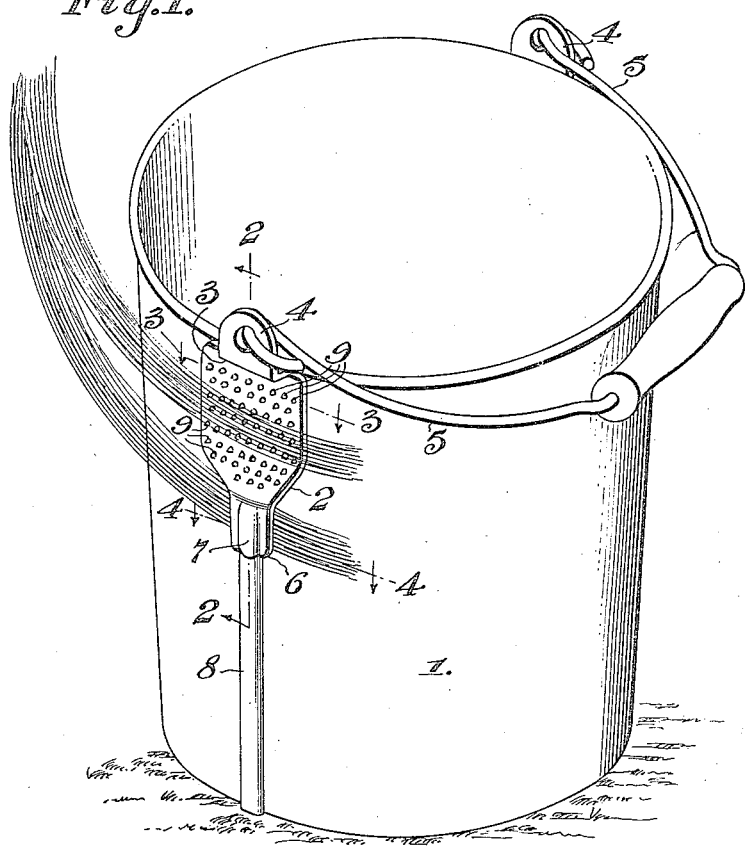
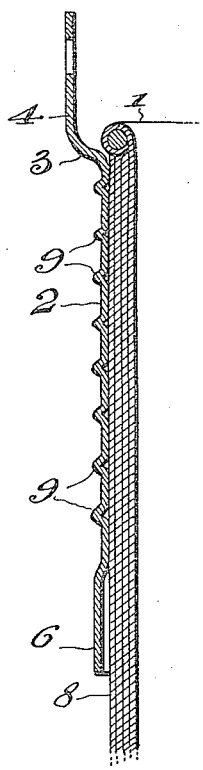
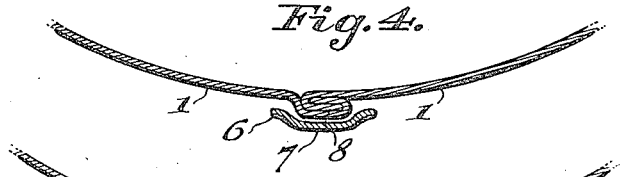
Inventor
JOSEPH B. HOHMANN
By Albert E Dietrich
Attorney Patented Jan. 26, 1937

2,068,647

UNITED STATES PATENT OFFICE 2,068,647

COMBINED ANTISLIPPING MILK PAIL AND COWTAIL HOLDER

Joseph B. Hohmann, Jacksonville, Oreg.

Application September 16, 1935, Serial No. 40,826

3 Claims. (Cl. 31—54)

My invention relates to the art of dairying and especially to the milking of cows. In hand milking the milker usually sits on a stool with the milk pail between his legs adjacent the knees. Heretofore, difficulty has been encountered because the switching of the cow's tail not only causes it to get into the milk and deposit foreign matter in the pail, but also annoys the milker, frequently causing him momentarily to lose his grip on the pail, with the result that the pail slips. Furthermore, in the milk pails in common use having smooth sides, it is almost impossible to hold the pail from slipping in any event.

My invention therefore has for an object to provide a device mounted on the pail which will perform the two-fold function of preventing slipping of the pail and holding the cow's tail. Further, it is an object of the invention to provide an attachment for milk pails, especially those having a vertical seam, so constructed at its lower extremity that when the hairs of the cow's tail are engaged between the attachment and the pail they are forced into a crimped position, thus aiding in holding the tail to the pail.

Another object is to provide an attachment with a roughened outer face to be engaged by the milker's legs or knees in order to hold the pail against slipping, and also functioning to assist in holding the cow's tail when desired by putting a portion of the hair between the roughened face and the leg of the milker where it engages that face.

Further, it is an object to provide an attachment for milk pails for the purposes specified which will be inexpensive to manufacture, can be applied to old or new pails, and will not add greatly to the cost thereof.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:—

Figure 1 is a perspective view of a milk pail with my invention applied, showing how a cow's tail may be held.

Figure 2 is an enlarged detail vertical section on the line 2—2 of Figure 1.

Figure 3 is a detail horizontal section on the line 3—3 of Figure 1.

Figure 4 is a detail horizontal section on the line 4—4 of Figure 1.

Figure 5 is a detail horizontal section of a modified form of the invention, the section being taken on approximately the line 3—3 of Figure 1.

In the drawing, in which like numerals and letters of reference indicate like parts in all the figures, I represents the usual bucket having a vertical seam 8. These buckets are usually provided with ears to which a carrying bail 5 is hooked or otherwise connected.

When my invention is used the ears 4 may be an integral part of the attachment, or attachments.

2 designates a plate which is shaped to conform substantially to the curvature of the bucket and which is attached to the bucket over the seam 8 by welding, soldering, or other appropriate means. When the ear 4 is formed as a part of the plate 2 it is preferably offset as at 3. The plate 2 at its lower end tapers inwardly to form the tongue 6 which is preferably slightly spaced from the seam 8 and is formed to overlie the seam, being preferably grooved as at 7 so that the side edges of the tongue 6 will lie close to the body I of the can. (See Figure 4.) The tongue 6 forms a convenient holder in cooperation with the pail I and its rib 8, under which tongue hairs of the cow's tail may be slipped to hold the tail.

The outer face of the body portion of the plate 2 is suitably roughened as at 9. This may be done by stamping or otherwise forming teats or knobs at suitably spaced intervals, or the body of the plate may be corrugated as at 9a (see Figure 5) for the purpose of providing a roughened outer surface against which the legs of the milker may be pressed to hold the pail.

The tongue 6 has a "roughened" surface to assist the roughened portions 9 or 9a in holding the pail from slipping.

If found necessary or desirable, a portion of the hairs of the cow's tail may be clamped under the tongue 6 and another portion held by the milker's legs against the roughened surface 9 or 9a, thereby securely holding the cow's tail against becoming detached from the pail during the milking process.

The pail is provided with one of my attachment plates 2 on each side, and the ears to which the bail 5 is attached are formed by extensions of the plates 2.

From the foregoing description, taken in connection with the accompanying drawing, it is thought that the construction, uses and advantages of the invention will be clear to those skilled in the art, and I also desire it to be understood that slight changes in the form and design of the invention may be made without departing from the spirit thereof, or the scope of the appended claims.

What I claim is:

1. In combination with a milk pail, a plate secured to the side of the pail, said plate having a roughened outer surface and a tongue, the latter being spaced from the wall of the pail for purposes specified.

2. A pail having a vertical seam, a plate overlying said seam and secured to the wall of the pail, said plate having an offset tongue overlying said seam substantially as and for the purposes described.

3. A pail having a vertical seam, a plate overlying said seam and secured to the wall of the pail, said plate having an offset grooved tongue overlying said seam substantially as and for the purposes described.

JOSEPH B. HOHMANN.